United States Patent [19]
Albrecht

[11] Patent Number: 6,025,968
[45] Date of Patent: Feb. 15, 2000

[54] LOAD/UNLOAD DISK DRIVE WITH MULTISTAGE RETRACT CIRCUIT FOR PARKING THE HEAD CARRIERS ON POWER DOWN

[75] Inventor: Thomas Robert Albrecht, San Jose, Calif.

[73] Assignee: International Business Machines Corporation, Armonk, N.Y.

[21] Appl. No.: 08/880,835

[22] Filed: Jun. 23, 1997

[51] Int. Cl.[7] .................................................. G11B 21/02
[52] U.S. Cl. ...................... 360/75; 360/105; 360/78.01; 360/78.04; 360/78.12; 318/561
[58] Field of Search .......................... 360/75, 105, 78.01, 360/78.04, 78.12, 72.1; 318/563, 368, 561

[56] References Cited

U.S. PATENT DOCUMENTS

| | | | |
|---|---|---|---|
| 4,237,501 | 12/1980 | Barmache et al. | 360/75 |
| 4,751,595 | 6/1988 | Kishi et al. | 360/105 |
| 4,786,995 | 11/1988 | Stupeck et al. | 360/75 |
| 4,807,062 | 2/1989 | Onodera | 360/75 |
| 5,091,680 | 2/1992 | Palm | 318/368 |
| 5,455,496 | 10/1995 | Williams et al. | 318/563 |
| 5,486,957 | 1/1996 | Albrecht | 360/75 |
| 5,737,144 | 4/1998 | Ataee et al. | 360/75 |
| 5,889,629 | 3/1999 | Patton, III | 360/75 |

*Primary Examiner*—Aristotelis M. Psitos
*Assistant Examiner*—Joseph M Vann
*Attorney, Agent, or Firm*—Thomas R. Berthold

[57] ABSTRACT

A data recording disk drive uses a circuit responsive to the removal of power to the spindle motor to generate a two-stage torque to retract the actuator and move it to a parking ramp. The spindle motor power removal circuit sends an initial signal to a first switch connected to a full-wave rectifier retract circuit and, after a predetermined delay time, a second signal to a second switch also connected to the rectifier circuit. Activation of the first switch causes only a portion of the available current from the spindle motor windings to reach the actuator, so that the actuator is moved with an initial low-level torque which is sufficient to bring the actuator to the disk OD of the disk under all circumstances. Activation of the second switch a predetermined delay time later allows all available current to reach the actuator so the actuator is then moved with a high-level torque which is sufficient to properly park the sliders on the load/unload ramp under all conditions. The spindle motor power removal circuit includes a resistor-capacitor (RC) circuit to generate the second signal. Selection of the desired delay time is made by design of the appropriate RC time constant of the RC circuit.

15 Claims, 6 Drawing Sheets

6,025,968

LOAD/UNLOAD DISK DRIVE WITH MULTISTAGE RETRACT CIRCUIT FOR PARKING THE HEAD CARRIERS ON POWER DOWN

TECHNICAL FIELD

This invention relates in general to data recording disk drives, and more particularly to a magnetic recording rigid disk drive that has a rectifier circuit for converting back electromotive force from the spindle motor to actuator coil current to drive the carrier to a load/unload ramp parking location when the disk drive is powered down.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read or write operations. The actuator is a voice coil motor (VCM) comprising a coil movable through a magnetic field generated by a fixed permanent magnet assembly. There are typically a plurality of disks separated by spacer rings and stacked on a hub that is rotated by a disk drive motor, also called a spindle motor. A housing supports the spindle motor and head actuator, and surrounds the head and disk to provide a substantially sealed environment for the head-disk interface.

In conventional magnetic recording disk drives, the head carrier is an air-bearing slider that rides on a bearing of air above the disk surface when the disk is rotating at its operational speed. The slider is maintained next to the disk surface by a suspension that connects the slider to the actuator. The slider is either biased toward the disk surface by a small spring force from the suspension, or is "self-loaded" to the disk surface by means of a "negative-pressure" air-bearing surface on the slider. In contrast to conventional air-bearing disk drives, contact or near-contact disk drives have been proposed that place the head carrier in constant or occasional contact with the disk or a liquid film on the disk during read and write operations. Examples of these types of disk drives are described in IBM's U.S. Pat. No. 5,202,803 and published European application EP 367510; U.S. Pat. No. 5,097,368, assigned to Conner Peripherals; and U.S. Pat. No. 5,041,932, assigned to Censtor Corporation.

Most conventional magnetic recording disk drives are of the contact start/stop (CSS) type that operate with the slider in contact with the disk surface during start and stop operations when there is insufficient disk rotational speed to maintain the air bearing. To minimize the effect of "stiction", i.e., the static friction and adhesion forces between the very smooth disk surface and the slider, CSS disk drives often use a dedicated "landing zone" where the slider is parked when the drive is not operating. The landing zone is typically a specially textured nondata region of the disk.

In contrast to CSS disk drives, "load/unload" disk drives address the stiction problem by mechanically unloading the slider from the disk when the power is turned off, and then loading the slider back to the disk when the disk has reached a speed sufficient to generate the air bearing. The loading and unloading is typically done by means of a ramp that contacts the suspension when the actuator is moved away from the data region of the disk. The slider is thus parked off the disk surface with the suspension supported in a recess of the ramp. Load/unload disk drives provide a benefit in laptop and notebook computers because the parking of the slider on the ramp away from the disk surface also provides some resistance to external shocks caused by moving or dropping the computer.

The parking of the sliders on the load/unload ramp during disk drive power down is typically accomplished by use of the back electromotive force (EMF) generated by the freely rotating spindle motor. When the disk drive supply voltage is removed, the VCM is disconnected from its driver circuitry and connected to a rectifier circuit that is coupled to the spindle motor. The output of the freely rotating spindle motor is converted by the rectifier circuit to a DC current supplied to the coil of the VCM. This causes the actuator to move the sliders to the ramp. A significant amount of torque is needed to ensure that the sliders are fully parked on the ramp, regardless of the actuator position or velocity at power down. If a drive fails to unload the heads from the disk surfaces before spinning down, an unrecoverable stiction failure may occur. A three-phase, full-wave rectifier circuit with Schottky barrier diodes is commonly used for this purpose. Because there are always two diodes in series with the VCM load, the total voltage drop in this rectifier circuit can be relatively high, thus reducing the DC current available to the VCM. The diodes can be replaced with field-effect transistors (FETs) to reduce the voltage drop, but such devices need to be switched on and off synchronously with each phase of the spindle motor. This requires additional sensing and control circuitry which needs its own DC power source, e.g., a storage capacitor, because the back EMF is insufficient to also power this circuitry. IBM's U.S. Pat. No. 5,486,957 describes a high-efficiency, low-cost actuator retract rectifier circuit that uses bipolar transistors that are turned on by a small amount of current from the spindle motor, with the remaining spindle motor current being directed through the emitter-collector paths of the transistors to the coil of the actuator. Since the initial conditions of actuator position and velocity are unknown at the moment of power-off, sufficient torque must be applied to handle the worst case situation, i.e., actuator at the outside diameter (OD) of the disk near the load/unload ramp with zero velocity. However, if the retract system applies immediately the full torque needed for the worst case, excessive actuator acceleration and velocity may occur, resulting in excessive impact as the actuator hits the OD crash stop when it reaches the parking ramp. An example of when excessive acceleration occurs is the following: If the actuator is at rest near the inside diameter (ID) of the disk, or moving toward the ID from any location on the disk, the applied retract torque will first move the sliders across the disks (from ID to OD) before reaching the ramp. During this time, the lack of resistance to actuator motion results in large acceleration and velocity before reaching the load/unload ramp. Excessive impact occurs at the crash stop. High-seed camera investigation has shown about a factor of 2X actuator speed difference at the ramp between the cases of the actuator starting at rest at the ID or at rest at the OD. Excessive impact is undesirable because it can damage the fragile head/suspension assemblies, and cause significant dynamic pitching and rolling of the sliders when the actuator hits the crash stop. Excessive slider motion can cause the sliders to contact the ramp structure, or perhaps other sliders. Such contact can result in slider damage or transfer of contamination to the air-bearing surface, which can lead to head-disk interface failures.

What is needed is a simple, low-cost, power-efficient rectifier circuit that provides a high enough torque to bring the actuator to the disk OD under all initial conditions without excessive impact of the crash stop, but yet sufficient to properly park the sliders on the load/unload ramp.

SUMMARY OF THE INVENTION

The invention is a data recording disk drive that uses a circuit responsive to the removal of power to the spindle motor to generate a two-stage torque to the actuator. The spindle motor power removal circuit sends an initial signal to a first switch connected to the full-wave rectifier retract circuit and, after a predetermined delay time, a second signal to a second switch also connected to the rectifier circuit. Activation of the first switch causes only a portion of the available current from the spindle motor windings to reach the actuator, so that the actuator is moved with an initial low-level torque which is sufficient to bring the actuator to the disk OD of the disk under all circumstances. Activation of the second switch a predetermined delay time later allows all available current to reach the actuator so the actuator is then moved with a high-level torque which is sufficient to properly park the sliders on the load/unload ramp under all conditions. The spindle motor power removal circuit includes a resistor-capacitor (RC) circuit to generate the second signal. Selection of the desired delay time is made by design of the appropriate RC time constant of the RC circuit. In the preferred embodiment of the invention, the high-efficiency, low-cost actuator retract rectifier circuit of IBM's U.S. Pat. No. 5,486,957 is controlled so that its bipolar transistors are turned on in stages, with current from only one of the spindle motor windings providing the initial low-level torque to the actuator and current from all of the windings providing the second stage high-level torque.

For a fuller understanding of the nature and advantages of the present invention, reference should be made to the following detailed description taken together with the accompanying drawing.

DETAILED DESCRIPTION

Prior Art

Figure 1:
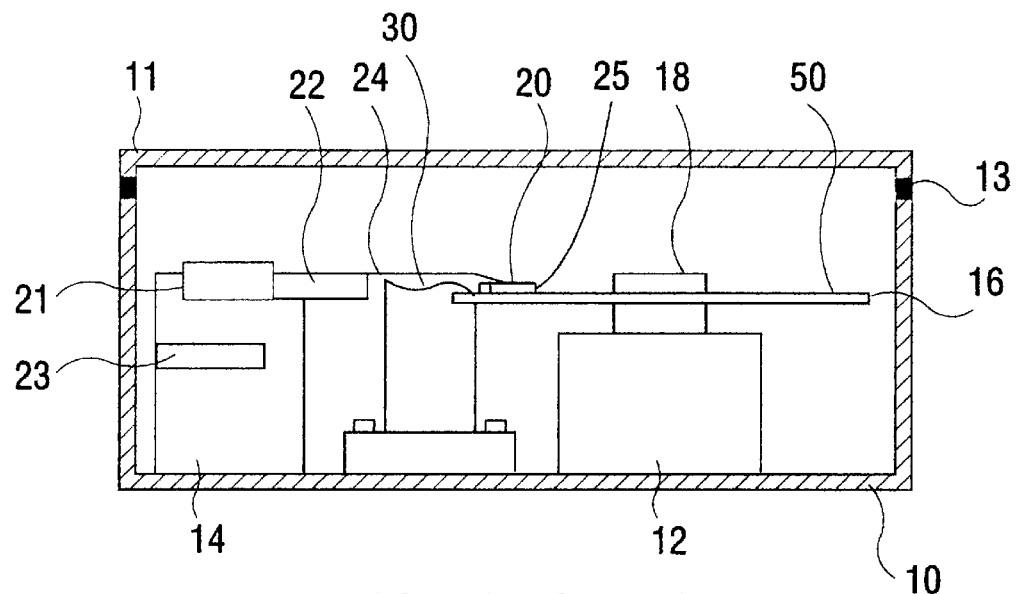
FIG. 1 is a sectional schematic view of a conventional disk drive.
Figure 2:
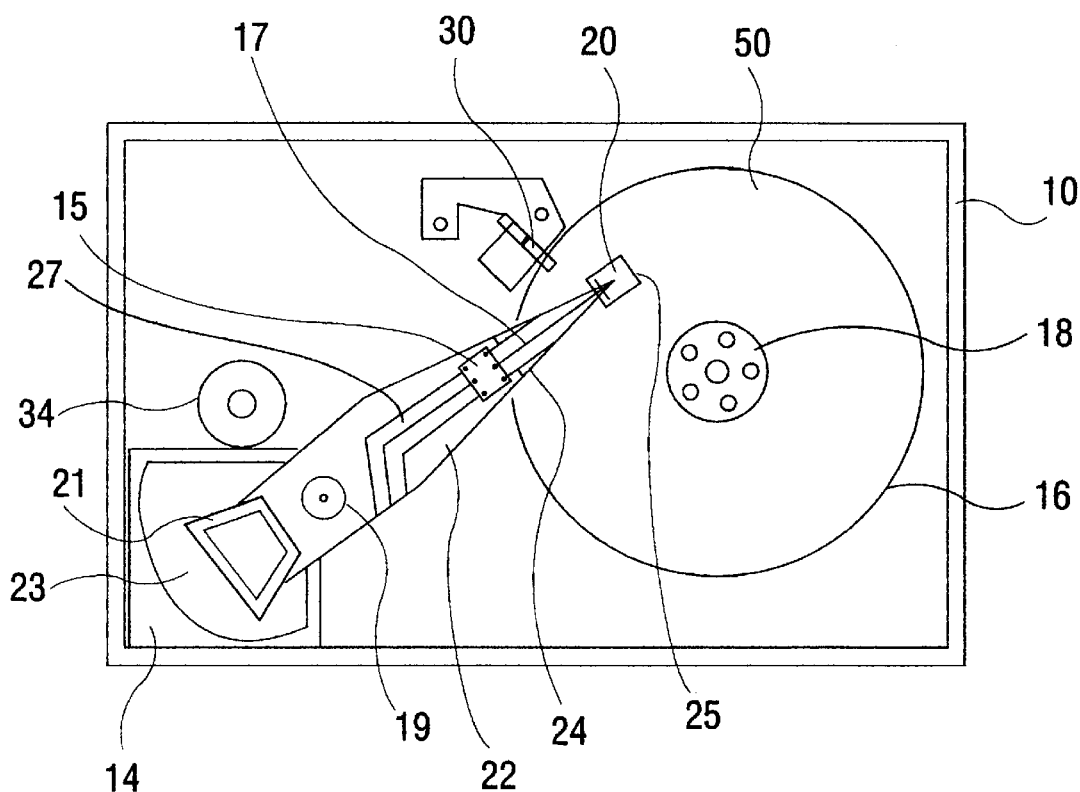
FIG. 2 is an open top view of the disk drive depicted schematically in FIG. 1 and shows the head load/unload ramp and actuator crash stop.

Referring first to FIG. 1, there is illustrated in sectional view a schematic of a conventional disk drive. For ease of illustration and explanation, the disk drive depicted in FIGS. 1 and 2 is shown as having a single recording head and associated disk surface, although conventional disk drives typically have multiple heads and disks. The disk drive comprises a base 10 to which are secured a disk As drive or spindle motor 12 and an actuator 14, and a cover 11. The base 10 and cover 11 provide a substantially sealed housing for the disk drive. Typically, there is a gasket 13 located between base 10 and cover 11, and a small breather port (not shown) for equalizing pressure between the interior of the disk drive and the outside environment. A magnetic recording disk 16 is connected to spindle 20 motor 12 by means of a spindle or hub 18. A thin film 50 of lubricant is maintained on the surface of disk 16. The lubricant may be a conventional perfluoro-polyether (PFPE) disk lubricant, such as Z-DOL brand from Montedison. A read/write head or transducer 25 is formed on the trailing end of an air-bearing slider 20. Transducer 25 may be an inductive read and write transducer or an inductive write transducer with a magnetoresistive (MR) read transducer formed by thin-film deposition techniques as is known in the art. The slider 20 is connected to the actuator 14 by means of a rigid arm 22 and a suspension 24, the suspension 24 providing a biasing force that urges the slider 20 onto the surface of the recording disk 16. The arm 22, suspension 24, and slider 20 with transducer 25 are referred to as the head-arm assembly. During operation of the disk drive, the spindle motor 12 rotates the disk 16 at a constant speed, and the actuator 14 pivots on shaft 19 to move the slider 20 generally radially across the surface of the disk 16 so that the read/write transducer 25 may access different data tracks on disk 16. The actuator 14 is a rotary voice coil motor (VCM) having a coil 21 that moves through the fixed magnetic field of magnet assembly 23 when current is applied to the coil.

FIG. 2 is a top view of the interior of the disk drive with the cover 11 removed, and illustrates in better detail the suspension 24 that provides a force to the slider 20 to urge it toward the disk 16. The suspension may be a conventional type of suspension, such as the well-known Watrous suspension, as described in U.S. Pat. No. 4,167,765 assigned to IBM. This type of suspension also provides a gimbaled attachment of the slider which allows the slider to pitch and roll as it rides on the air bearing. The data detected from disk 16 by the transducer 25 is processed into a data readback signal by signal amplification and processing circuitry in the integrated circuit chip 15 located on arm 22. The signals from transducer 25 travel via cable 17 to chip 15, which sends its output signals via cable 27.

A load/unload ramp 30 is mounted to the base 10. Ramp 30 contacts suspension 24 and lifts the slider 20 away from the disk 16 when the actuator 14 rotates the slider 20 toward the disk outside diameter when the disk drive is powered down. Examples of conventional types of load/unload ramps are described in U.S. Pat. Nos. 3,984,873, assigned to Information Storage Systems, Inc. (see FIG. 5); and 5,027,241, assigned to Quantum Corporation. An actuator crash stop 34 is mounted to the base 10 to prevent excessive movement of the actuator arm 22 and to assure that the suspension 24 does not move too far up ramp 30. The parking location for the actuator 14 when the disk drive is stopped will be with the slider 20 unloaded off the disk 16 by the ramp 30 and the actuator up against crash stop 34.

Figure 3:
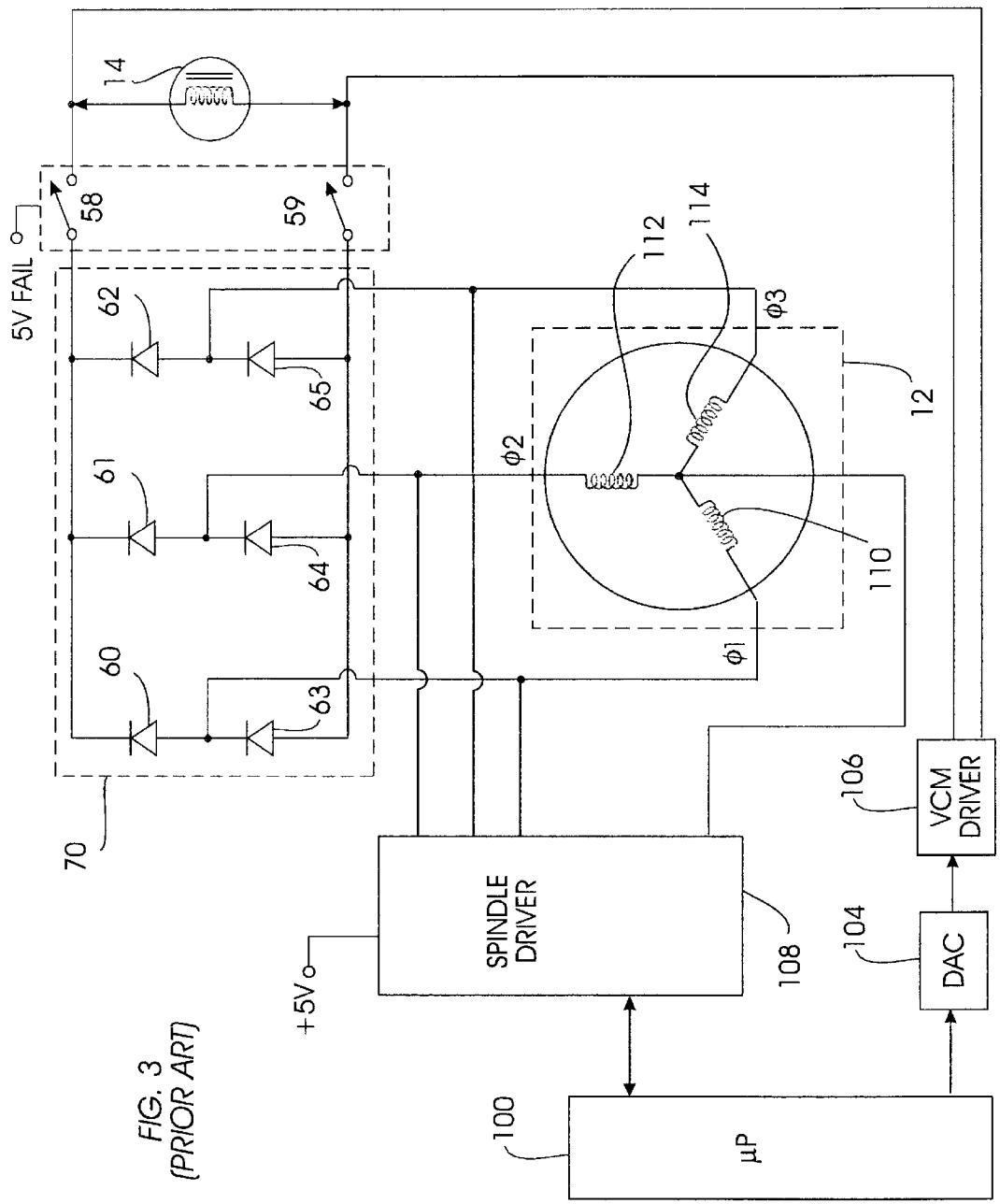
FIG. 3 is a block diagram of a disk drive showing a prior art diode-type rectifier circuit for converting spindle motor back EMF to VCM current for parking the head carrier at power down.

Referring now to FIG. 3, the drive includes a microprocessor 100 that controls the VCM 14 and the spindle motor 12. During read and write operations, the microprocessor 100 receives head position servo information from disk 16 and generates digital output to a digital-to-analog converter (DAC) 104. DAC 104 is coupled to a VCM driver 106 that sends current pulses to the coil of VCM 14 to move the head 25 (FIG. 2) on slider 20 to the appropriate data track on disk 16 during track "seeking", and to maintain the head 25 on track during track "following". Microprocessor 100 also controls and is connected to the spindle motor 12 via spindle driver 108. The spindle driver 108 controls the current from the power supply (e.g., a 5V battery source in the case of notebook and laptop computers) to the windings of spindle motor 12 to rotate the motor at a constant rotational speed during drive operation. In addition, the spindle driver 108 provides a status signal to microprocessor 100 indicating whether or not the spindle motor 12 is rotating at its operating speed. The spindle motor 12 may be a "delta" or "Y" (as shown in FIG. 3) type brushless, three-phase motor with fixed windings 110, 112, 114 as field coils and a permanent magnet rotor.

FIG. 3 also illustrates the prior art rectifier circuit 70 for energizing the VCM 14 at disk drive power down with the back EMF from spindle motor 12 windings 110, 112, 114. The design of the VCM driver 106 and spindle driver 108 is such that when power is removed, their respective output lines to the VCM 14 and spindle motor 12 behave as open circuits (disconnected). When power is removed (indicated by the 5V FAIL line), appropriate circuitry closes switches 58 and 59, which may be relays, solid state switches such as FETs, or other switching devices. The VCM 14 and spindle motor 12 are then effectively disconnected from the VCM driver 106 and spindle driver 108, and connected to rectifier circuit 70. The rectifier circuit 70 includes semiconductor directional current control devices in the form of diodes 60–65 which form a conventional three-phase, full-wave rectifier. When power is removed, the spindle motor 12 (and the disk stack mounted on it) continue spinning due to rotational inertia. Back EMF in the spindle motor 12 results in the generation of AC currents in the motor windings 110, 112, 114. The spindle motor 12 essentially behaves as a three-phase AC generator, and the resulting output current is rectified by the rectifier circuit 70. The output of the rectifier circuit 70 is a DC current that flows through the now closed switches 58 and 59 to the VCM 14, causing the VCM 14 to move slider 20 (FIG. 2) to the desired power-off parked position, such as ramp 30.

Figure 4:
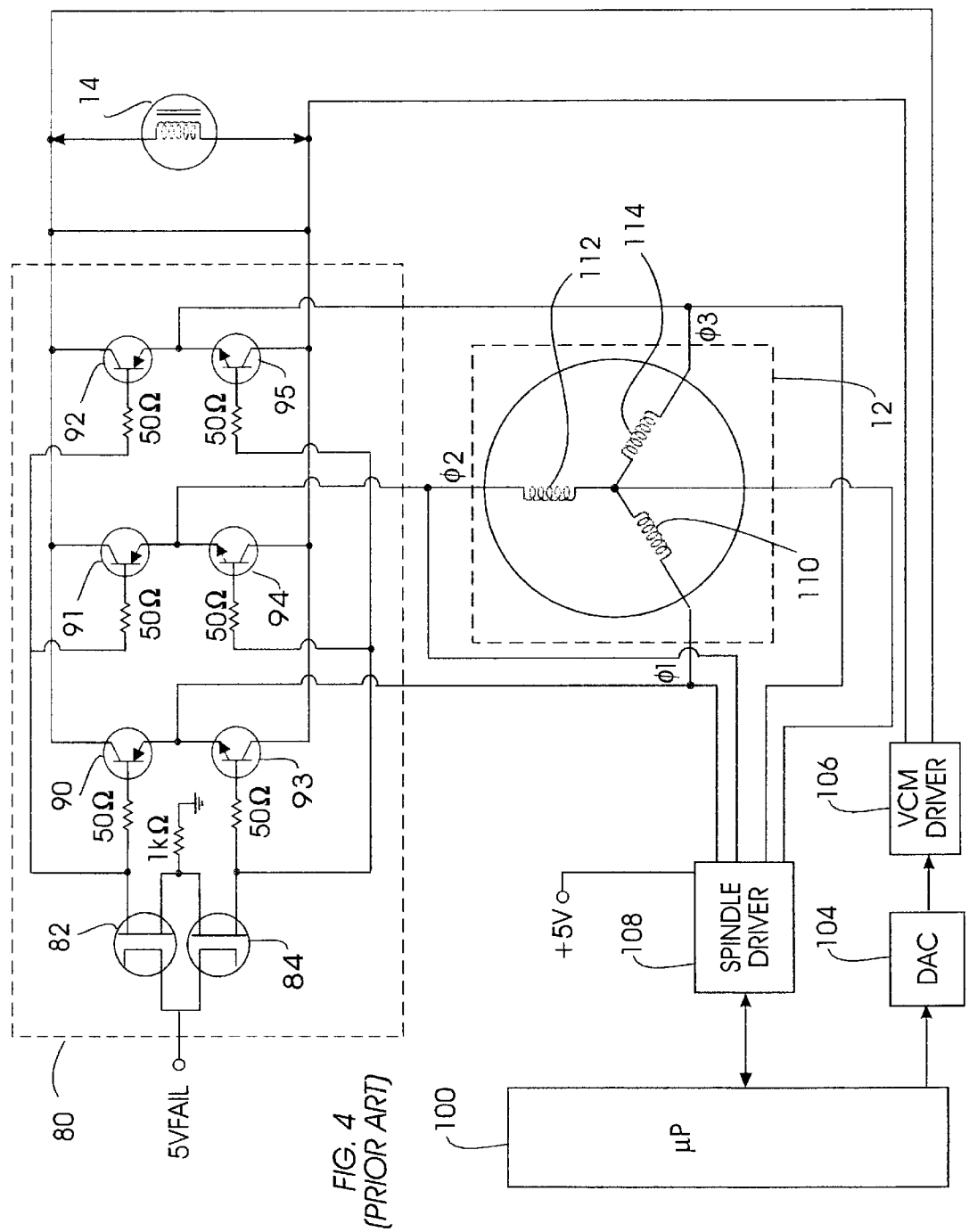
FIG. 4 is a block diagram of a disk drive showing a prior art high-efficiency rectifier circuit using bipolar transistors.

Another prior art power-off actuator retract system, as described in IBM's U.S. Pat. No. 5,486,957, is shown in FIG. 4. Spindle motor 12, spindle motor driver 108, VCM 14, and VCM driver 106 are identical in operation as described. The rectifier circuit 80 uses a switch that closes when a positive voltage is applied. The switch may be a relay, a single FET, or other suitable switching device. In the preferred embodiment, the switch is a pair of enhancement mode FETs 82, 84 that close when a positive voltage is applied to their "5V FAIL" input. The 5V FAIL signal comes from power-off detection circuitry (not shown). (The power-off detection circuitry is typically powered by a small capacitor that stores charge to operate the detection circuitry after power has been removed. The 5V FAIL input requires virtually no current so only a small capacitor is needed.) Bipolar transistors 90–95 in rectifier circuit 80 serve as the semiconductor directional current control devices that are connected between spindle motor windings 110, 112, 114 and VCM 14. The PNP transistors 90, 91, 92 feed current to one side of VCM 14, and their paired NPN transistors 93, 94, 95 feed the other side of VCM 14.

Figure 5:
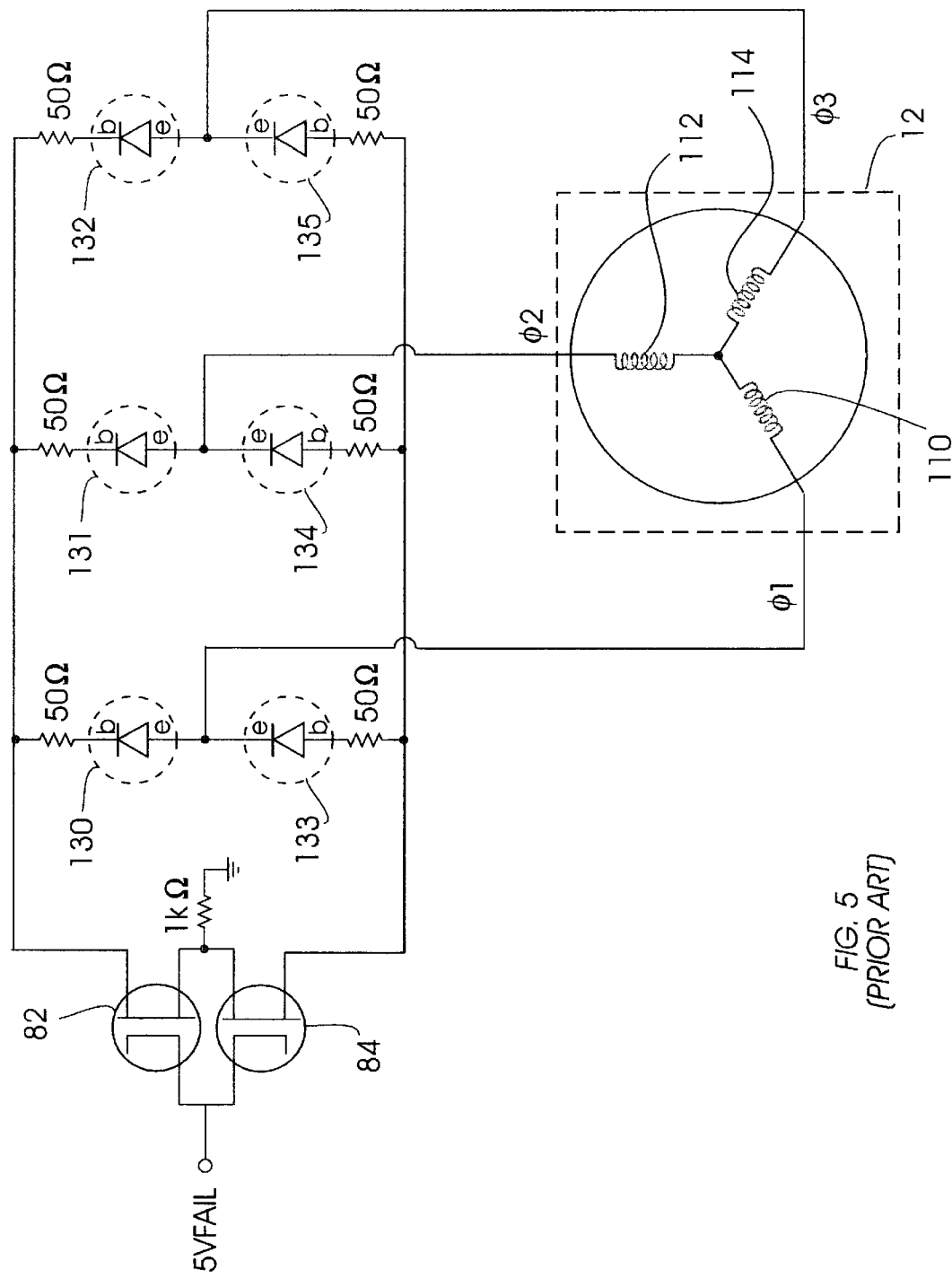
FIG. 5 is a simplified circuit diagram showing the equivalent circuit that synchronously turns on the transistors in the prior art rectifier circuit of FIG. 4.

Referring now to the simplified equivalent circuit diagram of FIG. 5, when the switch (FETs 82, 84) is closed, "diodes" 130–135 represent the emitter-base junctions of bipolar transistors 90–95 and are connected as a three-phase, full-wave rectifier that delivers a relatively small current from the spindle motor 12 through the resistors and the switch. The VCM 14 and the connection to the collectors of transistors 90–95 are not shown in FIG. 5 so that the synchronized switching of the transistors 90–95 can be better explained. The resulting emitter-base "rectifier" circuit is similar to that shown in the prior art circuit 70 (FIG. 3), except that the total current flowing in these emitter-base "diodes" 130–135 is small due to the series resistors (typically 50 ohm), and because the current in this emItter-base circuit does not flow through the VCM 14. This small current is sufficient to turn on the emitter-collector paths in the transistors 90–95 (FIG. 4), which are connected as a three-phase, full-wave rectifier delivering DC current to the VCM 14. Once the FETs 82, 84 are closed at drive power down, a small portion of the output from the windings 110, 112, 114 of the freely rotating spindle motor 12 automatically turns on the appropriate transistors so that the majority of the motor output can be directed to the VCM. This can be understood from FIG. 4 by considering as an example the instant when the current output from winding 110 is more positive than the current output from winding 112, and winding 114 has no output. Then current will flow in series through winding 110, the emitter-base junction of transistor 90, the 50 ohm resistor connected to transistor 90, FETs 82 and 84, the 50 ohm resistor connected to transistor 94, the emitter-base junction of transistor 94, and winding 112. This current turns on only transistors 90 and 94 and allows current from spindle motor 12 to go to VCM 14 through the emitter-collector paths of transistors 90 and 94 that are now in series with VCM 14.

Although each of the emitter-base junctions of transistors 90–95 requires approximately 0.6 volts to turn on, each of the emitter-collector paths of transistors 90–95 has a voltage drop of only 0.15–0.25 volts, if low collector-emitter voltage drop transistors are chosen. Since the emitter-base junctions are connected such that two junctions are always in series across the windings of spindle motor 12, at least 1.2 volts of back EMF is needed from the windings to turn on the respective two transistors. The circuit is thus designed so that the total back EMF is available to turn on the transistors. Of the total back EMF supplied by the spindle motor 12, however, only 0.3–0.5 volts is lost in the emitter-collector junctions that supply current to the VCM. The emitter-base currents are small relative to the emitter-collector currents in the transistors 90–95. The minimum amount of emitter-base current needed to turn on each transistor is determined by the "beta" of the transistor, which results typically in a ratio of emitter-collector/emitter-base current of between 50 and 500. (The 50 ohm resistors have been chosen to supply some excess current to the transistor bases. These resistors should have values optimized for the particular design used.) Thus, only a small fraction of the available current from spindle motor 12 is used in turning on the transistors, with the vast majority of the current flowing through the VCM 14.

When the FETs 82, 84 are open (no positive voltage applied at the 5V FAIL input), all transistors 90–95 are off, and no current flows anywhere in the rectifier circuit 80. Thus, when rectifier circuit 80 is turned off at the 5V FAIL input, it is effectively disconnected from both VCM 14 and spindle motor 12 so no additional switching circuitry is needed. To eliminate the need for any external charge storage to close the FETs 82, 84 at drive power down, the enhancement mode FETs in FIG. 5 may be replaced with depletion mode FETs. With this change, the depletion mode FETs would be turned off (switched open) during normal power-on operation of the disk drive, and would turn on (switched closed) when no voltage is applied to the input. Thus, removing power to the disk drive would automatically enable the rectifier circuit 80 to energize the VCM to move to the parking ramp.

Preferred Embodiments

Figure 6:
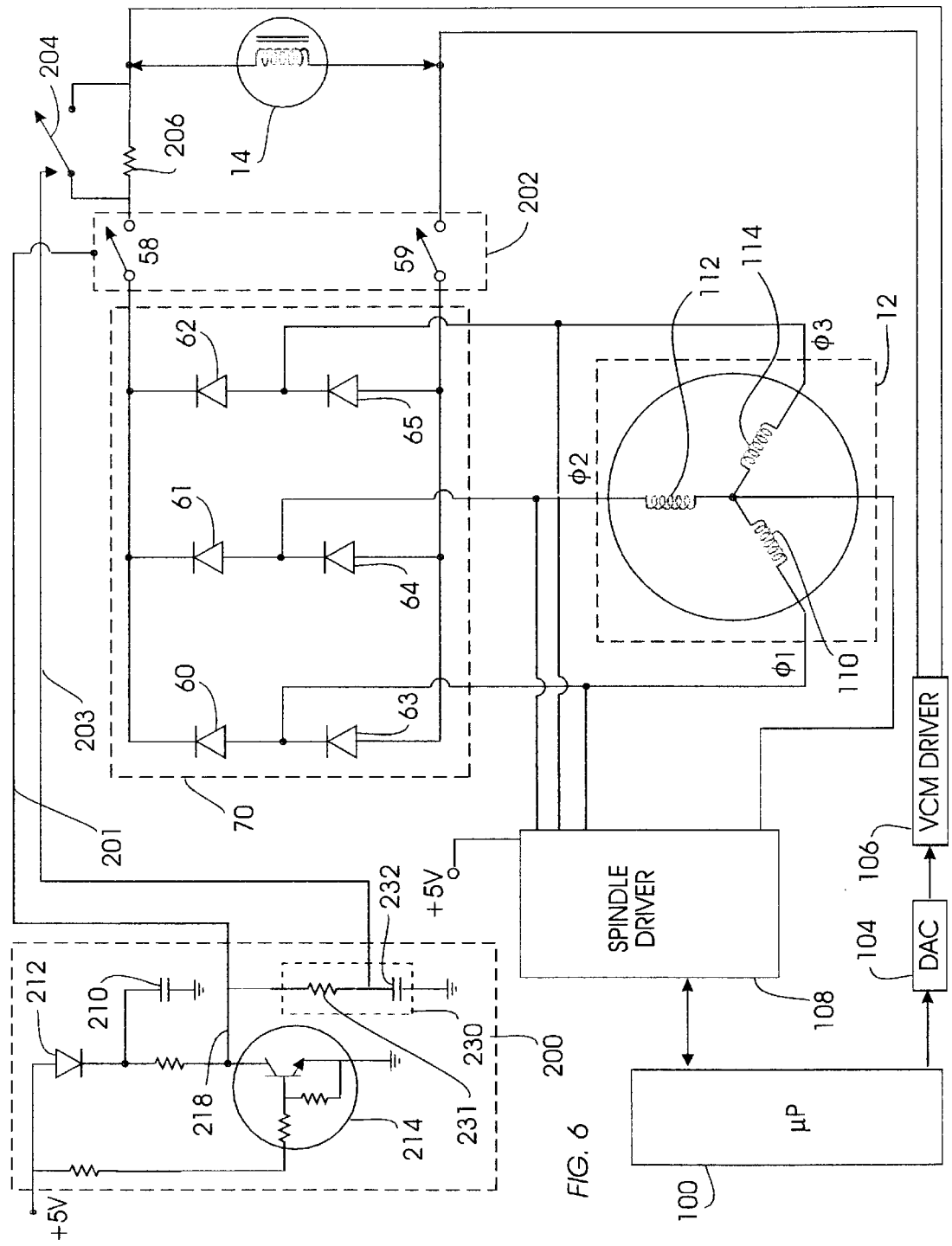
FIG. 6 is a block diagram of the present invention illustrating disk drive power-off circuitry connected to the rectifier circuit for providing a two-stage actuator retract torque.

Referring to FIG. 6, the present invention is illustrated wherein the circuit responsive to power off from the disk drive generates first and second signals to switches connected to the conventional rectifier circuit 70 (FIG. 3). The spindle motor power removal circuit 200 has a first line 201 connected to a first switch 202, and a second line 203 connected to a second switch 204. Switch 202 comprises a pair of switches 58, 59 at the output of rectifier circuit 70 that connect to the VCM 14. Switch 204 is connected at the output of rectifier circuit 70 and is located in parallel with an actuator resistor 206. Switch 204 and actuator resistor 206 are located in parallel connection between first switch 202 and VCM 14.

Spindle motor power removal or power-off circuit 200 is connected to a voltage supply (shown as 5V, as is common in portable or laptop computers). As long as the 5V is present at the input line to power removal circuit 200, capacitor 210 remains charged through diode 212 and transistor 214 is turned on. The signal on line 218 is a low value such that there is no output signal on either the first power-off signal line 201 or the second power-off signal line 203. Thus, both switches 202 and 204 are open, and VCM 14 is under the control of VCM driver 106. When the 5V are removed (5V FAIL) at the input line to power removal circuit 200, transistor 214 is turned off. Line 201 is then no longer shorted to ground, but is brought to a 5V potential by charge stored in capacitor 210. This causes switch 202 to close to connect all three phases of the spindle motor to the VCM 14. However, because second switch 204 is still open, a substantial portion of the DC current available to VCM 14 is dissipated by actuator resistor 206. The result is less than the full available current to VCM 14 such that VCM 14 is moved with a lower-than-maximum torque to the disk OD.

The circuit 200 includes a resistor-capacitor (RC) circuit 230 that includes resistor 231 and capacitor 232. Capacitor 232 is charged from capacitor 210 when transistor 214 is turned off. When the 5V power is off (5V FAIL), charge from capacitor 210 flows to capacitor 232 which brings line 203 to a high potential after a time delay proportional to the RC time constant of RC circuit 230. This serves as the second power-off signal that closes switch 204. This shorts actuator resistor 206 so that now the full DC current from rectifier circuit 70 is available to VCM 14, and a higher torque is applied to the actuator to move it to the disk OD. The delay time between the first power-off signal and the second power-off signal is predetermined by selecting values for resistor 231 and capacitor 232 to select the proper RC time constant.

The invention as shown in FIG. 6 reduces the risk of excessive actuator acceleration by providing an initial low-level retract torque (provided by the first power-off signal on line 201 closing switch 202), followed by a high-level torque (initiated by the second power-off signal on line 203 a predetermined delay time later to close switch 204). The initial low-level torque is selected to be strong enough to move the actuator to the disk OD under all circumstances, but not necessarily strong enough to park the actuator on the load/unload ramp for all initial conditions. The RC time constant of circuit 230 is selected so there is sufficient time for the actuator to reach the OD for all possible initial conditions. The power removal circuit 200 then applies the high-level actuator torque which is strong enough to ensure that the actuator is property parked on the ramp under all conditions.

Figure 7:
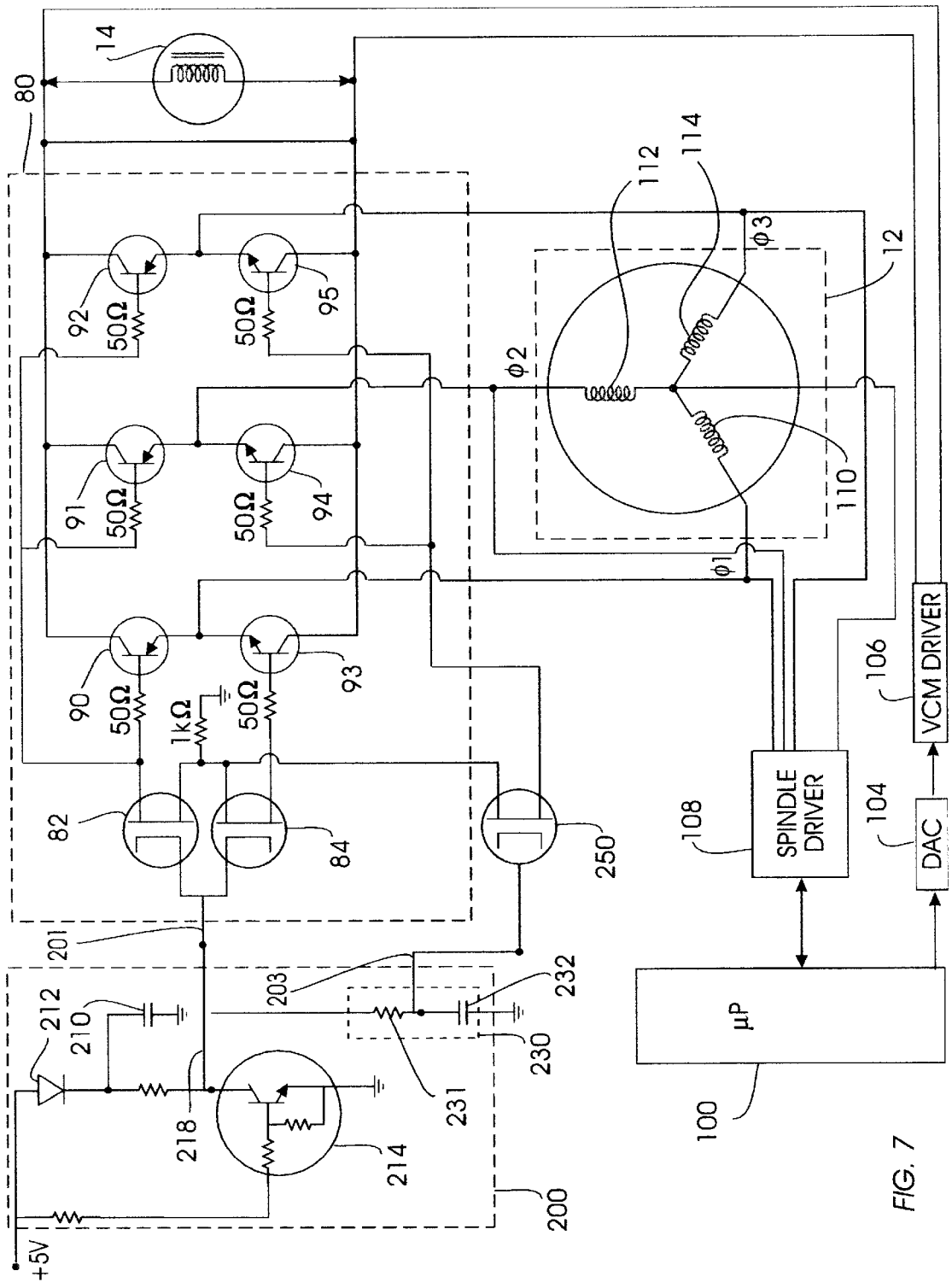
FIG. 7 is a detailed schematic of the preferred embodiment of the present invention as applied to the prior art rectifier circuit of FIG. 4 for providing a two-stage actuator retract torque.

Referring now to FIG. 7, the invention as described with respect to FIG. 6 is illustrated in the preferred embodiment where it is connected to the rectifier circuit shown and described in FIGS. 4 and 5. In this embodiment, the first power-off signal line 201 is connected to a pair of FETs 82, 84 which comprise a first switch. FET 250 comprises a second switch which is connected to the second power-off signal line 203. For purposes of explanation with respect to FIG. 7, transistors 90, 93 comprise a first pair which are connected to a first winding 110 of the spindle motor; transistors 91, 94 comprise a second pair connected to winding 112; and transistors 92, 95 comprise a third pair connected to winding 114. Each of transistors 90, 93 in the first pair have their emitter-base junctions connected in series between the first winding 110 and FETs 82, 84. Their emitter-collector junctions are connected in series between the first winding 110 and the actuator 14. Transistor 94 in the second pair and transistor 95 in the third pair each has its emitter-base junction connected to FET 250.

The power-off removal circuit 200 and the rectifier circuit 80 operate in the following manner. Immediately upon spindle motor power off, the line 201 goes high which turns on FETs 82, 84 comprising the first switch. This enables bipolar transistors 90, 91, 92, 93 to turn on, providing a single-phase rectified current to VCM 14 for actuator retract. After the predetermined delay time determined by the RC time constant of RC circuit 230, line 203 goes high to signal second switch FET 250 to turn on. This enables the remaining bipolar transistors 94 and 95 to turn on, which fully enables all three phases of the rectifier circuit 80. The effect of turning on phases of the spindle motor sequentially has the effect of providing a changing duty cycle in the retract current. When only one phase is turned on, the retract current has a duty cycle of approximately one-third. After the remaining phases are turned on, the retract current has a 100 percent duty cycle. Since the modulation rate is very fast compared to the time response of the actuator, this change in duty cycle effectively behaves as a change in torque and actuator acceleration. While FIG. 7 represents the preferred embodiment of operating the individual semiconductor current control devices with the two switches so that four of the bipolar transistors are turned on by the first switch, it is possible to connect the devices in different ways to the switches so that switch one controls some of the devices and switch two controls the remaining devices.

In the preferred embodiment shown in FIG. 7, the RC time constant of RC circuit 230 is chosen so that the transition from one-third to 100 percent duty cycle occurs after approximately 100–200 milliseconds. High-speed camera investigation has revealed that this is sufficient time for the actuator to move from any possible initial state to the OD of the disk for a 2.5-inch disk drive. Within this first stage time period, only slight deceleration of the spinning disks occurs so that at least approximately 90 percent of the maximum available retract torque is available to be applied in the second stage for the final high torque application to assure that the actuator is moved up the load/unload ramp.

While the preferred embodiments of the present invention have been illustrated in detail, it should be apparent that modifications and improvements may be made to the invention without departing from the spirit and scope of the invention as described in the following claims.

What is claimed is:

1. A data recording disk drive comprising:
   a data disk;
   a multiphase spindle motor having a winding for each phase and connected to the disk for rotating the disk;
   a transducer for writing data to or reading data from the disk;
   a carrier supporting the transducer;
   an actuator connected to the carrier for moving the carrier generally radially across the disk;
   a power removal response circuit responsive to the removal of power to the spindle motor;
   a full-wave rectifier circuit for converting back electromotive force from the spindle motor to current for the actuator when power to the spindle motor is removed;
   a first switch coupled between said power removal response circuit and the rectifier circuit and responsive to a first power-off signal from said power removal response circuit for directing a portion of the current from the freely rotating spindle motor to the actuator;
   a second switch coupled between said power removal response circuit and the rectifier circuit and responsive to a second power-off signal from said power removal response circuit for directing additional current from the freely rotating spindle motor to the actuator, the second power-off signal occurring a predetermined delay time after said first power-off signal; and
   an actuator resistor between the output of the rectifier circuit and the actuator, and wherein the first switch directs current from all of the spindle motor windings through the actuator resistor, the actuator resistor preventing a substantial portion of the current from the spindle motor windings from reaching the actuator.

2. The disk drive according to claim 1 wherein the second switch is located at the output of the rectifier circuit and in parallel with said actuator resistor, whereby when said second switch is closed substantially all of the current from all of the spindle motor windings bypasses the actuator resistor and is directed to the actuator.

3. A data recording disk drive comprising:
   a data disk;
   a multiphase spindle motor having a winding for each phase and connected to the disk for rotating the disk;
   a transducer for writing data to or reading data from the disk;
   a carrier supporting the transducer;
   an actuator connected to the carrier for moving the carrier generally radially across the disk;
   a power removal response circuit responsive to the removal of power to the spindle motor;
   a full-wave rectifier circuit for converting back electromotive force from the spindle motor to current for the actuator when power to the spindle motor is removed;
   a first switch coupled between said power removal response circuit and the rectifier circuit and responsive to a first power-off signal from said power removal response circuit for directing a portion of the current from the freely rotating spindle motor to the actuator;
   a second switch coupled between said power removal response circuit and the rectifier circuit and responsive to a second power-off signal from said power removal response circuit for directing additional current from the freely rotating spindle motor to the actuator, the second power-off signal occurring a predetermined delay time after said first power-off signal; and
   wherein said power removal response circuit comprises a first capacitor connected to the first switch and a resistor-capacitor (RC) circuit connected to the second switch for turning on the second switch a delay time after removal of spindle motor power, the delay time being predetermined from the RC time constant of the RC circuit.

4. A data recording disk drive comprising:
   a data disk;
   a multiphase spindle motor having a winding for each phase and connected to the disk for rotating the disk;
   a transducer for writing data to or reading data from the disk;
   a carrier supporting the transducer;
   an actuator connected to the carrier for moving the carrier generally radially across the disk;
   a power removal response circuit responsive to the removal of power to the spindle motor;
   a full-wave rectifier circuit for converting back electromotive force from the spindle motor to current for the actuator when power to the spindle motor is removed;
   a first switch coupled between said power removal response circuit and the rectifier circuit and responsive to a first power-off signal from said power removal response circuit for directing a portion of the current from the freely rotating spindle motor to the actuator;
   a second switch coupled between said power removal response circuit and the rectifier circuit and responsive to a second power-off signal from said power removal response circuit for directing additional current from the freely rotating spindle motor to the actuator, the second power-off signal occurring a predetermined delay time after said first power-off signal; and
   wherein the rectifier circuit comprises first, second, and third pairs of semiconductor directional current control devices, each pair of current control devices being associated with respective first, second, and third windings, each current control device in the first pair being connected between the first winding and the first switch, one of the current control devices in each of the second and third pairs being connected between its associated winding and the first switch, and the other of the current control devices in each of the second and third pairs being connected between its associated winding and the second switch.

5. The disk drive according to claim 4 wherein the current control devices are diodes.

6. The disk drive according to claim 4 wherein the current control devices are bipolar transistors, each transistor in the first pair having its emitter-base junction connected in series between the first winding and the first switch and its emitter-collector junction connected in series between the first winding and the actuator, one of the transistors in each of the second and third pairs having its emitter-base junction connected in series between its associated winding and the first switch and its emitter-collector junction connected in series between its associated winding and the actuator, and the other of the transistors in each of the second and third pairs having its emitter-base junction connected in series between its associated winding and the second switch and its emitter-collector junction connected in series between its associated winding and the actuator.

7. The disk drive according to claim 6 further comprising a plurality of resistors, each resistor being coupled to the emitter-base junction of an associated transistor for minimizing the current flowing from the windings through the emitter-base junctions of the transistors.

8. A data recording disk drive comprising:

a data disk;

a multiphase spindle motor having a winding for each phase and connected to the disk for rotating the disk;

a transducer for writing data to or reading data from the disk;

a carrier supporting the transducer;

an actuator connected to the carrier for moving the carrier generally radially across the disk;

a power removal response circuit responsive to the removal of power to the spindle motor;

a full-wave rectifier circuit for converting back electromotive force from the spindle motor to current for the actuator when power to the spindle motor is removed;

a first switch coupled between said power removal response circuit and the rectifier circuit and responsive to a first power-off signal from said power removal response circuit for directing a portion of the current from the freely rotating spindle motor to the actuator, the first switch comprising a pair of field-effect transistors; and a second switch coupled between said power removal response circuit and the rectifier circuit and responsive to a second power-off signal from said power removal response circuit for directing additional current from the freely rotating spindle motor to the actuator, the second power-off signal occurring a predetermined delay time after said first power-off signal.

9. The disk drive according to claim 8 wherein the field-effect transistors are depletion mode field-effect transistors held open by the application of power during operation of the disk drive and closed by the removal of power.

10. The disk drive according to claim 8 further comprising a ramp for supporting the carrier away from the disk surface.

11. A data recording disk drive comprising:

a data disk;

a multiphase spindle motor having a winding for each phase and connected to the disk for rotating the disk;

a transducer for writing data to or reading data from the disk;

a carrier supporting the transducer;

an actuator connected to the carrier for moving the carrier generally radially across the disk so the transducer may access different regions of data on the disk;

a power removal response circuit responsive to the removal of power to the spindle motor;

a first switch responsive to a first power-off signal from said power removal response circuit;

a second switch responsive to a second power-off signal from said power removal response circuit, the second power-off signal occurring a predetermined delay time after said first power-off signal; and a rectifier circuit for converting back electromotive force from the spindle motor to current for the actuator when power to the spindle motor is removed, the rectifier circuit comprising first, second, and third pairs of bipolar transistors, each pair of transistors being associated with respective first, second, and third windings, each transistor in the first pair having its emitter-base junction connected in series between the first winding and the first switch and its emitter-collector junction connected in series between the first winding and the actuator, one of the transistors in each of the second and third pairs having its emitter-base junction connected in series between its associated winding and the first switch and its emitter-collector junction connected in series between its associated winding and the actuator, and the other of the transistors in each of the second and third pairs having its emitter-base junction connected in series between its associated winding and the second switch and its emitter-collector junction connected in series between its associated winding and the actuator; and a plurality of resistors each resistor being coupled to the emitter-base junction of an associated transistor for minimizing the current flowing from the windings through the emitter-base junctions of the transistors;

whereby in response to closing of the first switch upon receipt of the first power-off signal, the freely rotating spindle motor generates current through the first winding to emitter-base junctions of the first pair of transistors to turn on the first pair of transistors and thereby direct remaining current from the first winding to the actuator, and in response to closing of the second switch upon receipt of the second power-off signal, the freely rotating spindle motor generates current through the second and third windings to emitter-base junctions of the second and third pairs of transistors, respectively, to turn on the second and third pairs of transistors and thereby direct remaining current from the second and third windings to the actuator.

12. The disk drive according to claim 11 wherein said power removal response circuit comprises a first capacitor connected to the first switch and a resistor-capacitor (RC) circuit connected to the second switch for turning on the second switch a delay time after removal of spindle motor power, the delay time being predetermined from the RC time constant of the RC circuit.

13. The disk drive according to claim 11 wherein the first switch comprises a pair of field-effect transistors.

14. The disk drive according to claim 13 wherein the field-effect transistors are depletion mode field-effect transistors held open by the application of power during operation of the disk drive and closed by the removal of power.

15. The disk drive according to claim 11 further comprising a ramp for supporting the carrier away from the disk surface.

* * * * *